United States Patent
Hiscock

(10) Patent No.: US 8,867,588 B2
(45) Date of Patent: Oct. 21, 2014

(54) CHIRP DATA CHANNEL SYNCHRONISATION

(75) Inventor: Paul Dominic Hiscock, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 117 days.

(21) Appl. No.: 13/602,081

(22) Filed: Aug. 31, 2012

(65) Prior Publication Data

US 2014/0064337 A1 Mar. 6, 2014

(51) Int. Cl.
*H04B 1/00* (2006.01)
*H04B 1/69* (2011.01)

(52) U.S. Cl.
CPC ........................ *H04B 1/69* (2013.01)
USPC .......................................... 375/139

(58) Field of Classification Search
CPC .......................... H04B 2001/6912; H04B 1/69
USPC .................................. 375/139, 219, 295, 354
See application file for complete search history.

(56) References Cited

U.S. PATENT DOCUMENTS

| 6,304,619 | B1 | 10/2001 | Citta et al. | |
|---|---|---|---|---|
| 2013/0051433 | A1* | 2/2013 | Hiscock | 375/139 |
| 2013/0129026 | A1* | 5/2013 | Petersen | 375/371 |

FOREIGN PATENT DOCUMENTS

| EP | 2317659 | 5/2011 |
|---|---|---|
| GB | 2490140 | 10/2012 |
| GB | 2494129 | 3/2013 |
| WO | WO 2010/040264 | 4/2010 |
| WO | WO 2013/172748 | 11/2013 |

OTHER PUBLICATIONS

Search Report issued Jan. 27, 2014 in corresponding British application GB1217805.9.

* cited by examiner

*Primary Examiner* — Khai Tran
(74) *Attorney, Agent, or Firm* — Pillsbury Winthrop Shaw Pittman LLP

(57) ABSTRACT

An aspect of the invention is directed to a method for maintaining the synchronization of a receiver with a chirp signal sent over a link from a transmitter. The chirp signal comprises at least a first chirp having a gradient greater than one. The transmitter may encode data on to the signal by varying the properties of the chirps it transmits. The receiver correlates the received first chirp with an expected reference chirp to produce a set of correlation results. Should the gradient of the received chirp match the gradient of the expected reference chirp, then a distinct large "prompt" peak will be present having a greater magnitude than any other correlation peaks present in the correlation results. Transmitted data symbols may be inferred from properties of this prompt peak, for example its position in samples in the correlation results.

17 Claims, 7 Drawing Sheets

CHIRP DATA CHANNEL SYNCHRONISATION

FIELD OF THE INVENTION

The present disclosure relates to maintaining synchronisation between a chirp transmitter and a chirp receiver.

Further, the present disclosure relates to estimating fractional timing and/or frequency offsets between chirp transmitters and receivers by comparing the magnitudes of peaks in correlation results.

BACKGROUND OF THE INVENTION

The chirp modulation method is a modulation method in which the frequency of a signal (chirp) varies linearly over time in a bandwidth. The bandwidth can be expressed as $F_s$; $F_s$ being a value in Hz. A chirp having a positive gradient in the frequency-time plane is generally referred to as an up-chirp, for example chirp 1 and chirp 2 on FIG. 1. A chirp having a negative gradient in the frequency-time plane is generally referred to as a down-chirp, for example chirp 3 on FIG. 1.

A chirp can be represented by a sequence of N samples. One or more identical contiguous chirps can form a symbol that represents a data value to be communicated. In one protocol a chirp can be represented mathematically as:

$$R(g,v)=e^{j\pi g(n\cdot f(v))(n+x\cdot f(v))/N}|_{n=0 \text{ to } N-1} \quad (1)$$

where R is the received chirp sequence, which is normally evaluated for all integer values of n from 0 to N−1 in order, g is the gradient of the chirp, v is a symbol value, n is the sample index, f(v) is a function that encodes v onto the chirp, which implicitly may also be a function of g, n, N and other constants, x is a constant, which may for example be set to N mod 2, and N is the total number of samples in the sequence. The number of valid values of v is the symbol set size, which is nominally N. However, in practice the symbol set size can be more or less than N depending on the quality of the link: for example, it might be advantageous to use fewer symbols if the link quality is poor. The value of |g| can have any value greater than 0 and less than N. Due to the modular nature of this expression negative gradients are obtained from N−1 backwards. Hence, a positive gradient of N−2 is equivalent to a negative gradient of −2. Where there are more than one identical contiguous chirps in a symbol, each chirp individually conveys the same value which is the symbol value of the symbol.

Chirp 1 in FIG. 1 has a starting frequency of $-F_s/2$ and a gradient of 1. It increases linearly in frequency over a period of N samples by $F_s$ to reach a frequency close to $+F_s/2$. Since this is a complex sampled system $+F_s/2$ is equivalent to $-F_s/2$. FIG. 1 illustrates an example in which two consecutive chirps have the same symbol value, whereas the third chirp is different. An apparent discontinuity in frequency between chirp 1 and chirp 2 occurs at n=N.

Chirp 4 in FIG. 2 has a gradient of 2 and a starting frequency of $-F_s/2$. Because it has double the gradient of the chirps of FIG. 1, it increases linearly in frequency to $+F_s/2$ in half the number of samples that the chirps in FIG. 1 do, i.e. it reaches close to $+F_s/2$ after close to N/2 samples. The chirp then wraps around in frequency. Since this is a sampled system, these frequency wraps are in effect continuous and have continuous phase. The chirp repeats the frequency sweep from $-F_s/2$ to $+F_s/2$ between samples N/2 and N.

The chirps also have continuous frequency and phase from one end of the chirp to the other. A cyclic shift of the samples that make up a chirp creates another valid chirp in this example system.

Chirps can be used to encode data in a variety of ways. Binary data may be transmitted using up and down chirps to represent zeros and ones respectively (or vice-versa). M-ary data may be encoded using M different cyclic rotations of a chirp. A transmitter may convey its identity using a sequence of chirps having different gradients. Data may also be encoded in the gradients of Zadoff-Chu codes (where N is a prime number and complex-valued sequences having the property that cyclically shifted versions of the sequence imposed on a signal result in zero cross-correlation with one another at the receiver).

On start-up, the clocks of transmitters and receivers in a communication system need to be synchronised to facilitate effective communication between them. In the case of chirp communications, a chirp receiver can have a buffer for accumulating received samples so that once a whole data symbol has been received it can be decoded. For memory economy (i.e. to minimise the amount of space needed for memory on a chip and thus the overall device size and cost), such a buffer may only be just large enough to accommodate the number of samples corresponding to a single symbol. Therefore, when such a receiver is switched on it needs to determine the symbol boundary timing so that it can acquire a whole symbol in its receive buffer instead of a latter part of one symbol and an early part of the next.

The timing offset of a receiver is the difference between the actual sampling instant of a digital representation of a received signal and the ideal sampling instant, which (in the absence of multipath) has the minimum bit error rate. A fractional timing offset is defined as a timing offset having a finite non-integer magnitude in samples. An absolute timing offset of more than half a sample is usually catastrophic as, in that case, the receiver samples are misaligned with the transmitter. In the absence of noise, a timing offset of up to half a sample will not lead to bit errors. However, in the presence of noise the tolerable limits are reduced. For example, the tolerable fractional timing offset limit might be ±0.2 samples.

A frequency offset can be defined as the lowest digital sampling frequency of the receiver minus the equivalent frequency in the transmitter and is measured in Hz. A frequency offset of zero indicates perfect frequency synchronisation. A fractional frequency offset is defined as a finite frequency offset with a magnitude that is not an integer multiple of $F_s/N$ Hz, where N is the chirp length in samples and F is the lowest digital receiver sampling frequency in Hz. Typically, a frequency offset of Fs/N Hz is equivalent to a shift in the correlator peak position of 1 sample. Hence, an absolute frequency offset of Fs/2N Hz or more is usually catastrophic as the receiver samples are misaligned with the transmitter. In the presence of noise the absolute tolerable limit would normally be reduced to less than $F_s/2N$ Hz. For example, the tolerable fractional frequency offset limit might be $±0.2*F_s/N$ Hz.

A variety of methods are known for initial synchronisation in which both integer (whole-sample) and fractional (sub-sample) timing and/or frequency equivalent offsets are determined and corrected for as is often necessary on start-up of a communication link.

For example, U.S. Pat. No. 6,304,619 describes synchronisation of a chirp transmitter and a chirp receiver by sending a synchronisation signal from the transmitter which consists of a sequence of up and down chirps having unity gradient. This concept is illustrated by FIG. 3a. The received synchronisation signal is correlated twice, firstly against a reference up chirp and secondly against a reference down chirp. This yields a set of correlation peaks for the up chirps and a set of correlation peaks for the down chirps. The peak positions are recorded relative to a fixed local clock, as illustrated by FIG. 3b. The timing offset between the transmitter and receiver, i.e. the start of a received chirp with respect to the receiver's local clock pulse, A, and the frequency offset between the transmitter and receiver B can be determined for pairs of correlated chirps according to the following simultaneous equations:

$$a = \frac{(\Delta_u + \Delta_d)}{2} \quad (2)$$

$$b = \beta(\Delta_u - \Delta_d) \quad (3)$$

where A is the timing offset in samples, B is the frequency offset in Hz, $\Delta_u$ is the number of samples between a local reference and the position of the up chirp peaks, $\Delta_d$ is the number of samples between a local reference and the position of the down chirp peaks, and $\beta$ is a factor relating the gradient of the chirp to the linear change in frequency over time. For example, $\beta$ may be $2F_s/N$ Hz. In other words, the frequency offset is calculated as proportional to the separation of the up and down chirp peaks, and the timing offset as their mean position in samples. The described synchronisation method determines both the timing and frequency offsets of the transmitter to the receiver in order to correct one of them to agree with the other.

An alternative integer and fractional synchronisation method, using synchronisation signals comprising two or more chirps having non-unity gradients of differing magnitudes, is described in the present applicant's co-pending UK patent application number 1114880.6.

Timing and/or frequency offsets between transmitters and receivers can occur subsequent to initial synchronisation in any communication system. These can cause the transmitters and receivers to lose synchronisation lock, making effective communication between them less efficient or in severe cases impossible. Timing and/or frequency offsets may arise for a number of reasons, including crystal oscillator drift due to, for example, temperature fluctuations. Drift of half a sample or more can result in bit errors when symbols are decoded. Accurate synchronisation is particularly important in communications systems involving radio transmission of long data sequences, or when a transmitter and receiver are moving relative to one another. In at least these cases it is necessary to track timing and frequency errors to prevent data corruption and link failure.

Re-synchronisation may be achieved by repeating the initial synchronisation procedure. This may be done periodically (in some packetized systems for example, a synchronisation word is contained in every packet) or in response to detection of bit errors. However the integer and fractional approaches discussed above require dedicated synchronisation signals to be transmitted, necessitating undesirable interruptions in data communications which reduce the overall data bandwidth. Chirp synchronisation signals are often constructed with long symbol lengths (e.g. of the order of milliseconds), making dedicated synchronisation signals particularly undesirable in these cases.

Some communication systems, including GPS, track timing errors by performing additional correlations earlier and later than the prompt signal. The heights of the early, prompt and late correlation peaks are compared, and a delay locked loop (DLL) used to adjust the timing if the prompt peak is not the largest. A similar technique is used for frequency tracking, where slow and fast correlation signals are generated in addition to the prompt signal and a phase locked loop (PLL) is used to correct the frequency if the prompt peak is not the largest. However, additional correlations require additional memory, gates and power. These techniques are therefore unsuitable for low cost and power sensitive systems such as those which often communicate data using chirps.

What is needed is a way of managing timing and/or frequency drift in chirp communication systems without requiring dedicated synchronisation signals or dedicated correlations.

SUMMARY OF THE INVENTION

According to a first aspect of the present invention there is provided a receiver device for receiving a chirp signal sent over a link by a chirp transmitter, comprising: a chirp receiver configured to receive a chirp signal comprising a first chirp, wherein the first chirp has a first gradient g, the magnitude of said first gradient being greater than one; a correlator configured to correlate the received first chirp, or a modified version of said received first chirp, with an expected first chirp to produce a first set of correlation results, wherein said first set of correlation results comprise: a first prompt correlation peak having a greater correlation magnitude than any other correlation peaks present in the first set of correlation results, and a first additional correlation peak; and a processor configured to make a first estimate of the fractional timing offset or fractional frequency offset of the received chirp signal from the receiver device by comparing the relative magnitudes of the first prompt correlation peak and the first additional correlation peak; and an adjustment unit responsive to the processor configured to cause the adjustment of the relative timing or frequency of the chirp receiver and the chirp transmitter by the first estimate.

The receiver device may suitably be configured to receive said first chirp having said first gradient, wherein said first gradient has an integer value. Said first gradient may be greater than two.

The receiver device may suitably be configured to receive a chirp signal comprising chirps described by Zadoff-Chu codes, wherein said chirps encode a series of data symbols and contiguous symbols have different Zadoff-Chu codes.

The processor may suitably be configured to extract a data symbol encoded in the chirp signal by determining the cyclic phase of the first chirp from the position of the first prompt correlation peak in the first set of correlation results.

The adjustment unit may suitably be configured to cause the adjustment of the relative timing or frequency of the chirp receiver and the chirp transmitter by adjusting the timing or frequency of the chirp receiver. The adjustment unit may suitably be configured to: make adjustments to the timing of the chirp receiver using a delay locked loop; and/or make adjustments to the frequency of the chirp receiver using a frequency locked loop or a phase locked loop.

The adjustment unit may suitably be configured to only cause the adjustment of the relative timing or frequency of the chirp receiver and the chirp transmitter if the first estimate is greater than a predetermined threshold value.

The correlator may suitably be configured to correlate the received first chirp with an expected first chirp having a gradient matching the gradient of the received first chirp. The processor may suitably be configured to: identify the first additional correlation peak as being due to a fractional timing offset if it is located one sample from the first prompt correlation peak; and identify the first additional correlation peak as being due to a fractional frequency offset if it is located |g| samples from the first prompt correlation peak.

The correlator may suitably be configured to: mix the received first chirp with a generated chirp having a gradient 1−g to form a first mixed chirp; and correlate the first mixed chirp with a chirp having unity gradient. The processor may suitably be configured to: identify the first additional correlation peak as being due to a fractional timing offset if it is located |g| samples from the first prompt correlation peak; and identify the first additional correlation peak as being due to a fractional frequency offset if it is located one sample from the first prompt correlation peak.

The receiver device could suitably further comprise a processor configured to negotiate the gradients of the chirps in the chirp signal between the chirp transmitter and the receiver device.

The processor may suitably be configured to make the first estimate of the fractional timing offset or fractional frequency offset of the received chirp signal from the receiver device by dividing the magnitude of the first additional correlation peak by the sum of the magnitudes of the first prompt correlation peak and the first additional correlation peak.

The chirp signal may further comprise one or more subsequent chirps, each such subsequent chirp having a gradient with magnitude greater than one; the correlator may suitably be configured to correlate each received subsequent chirp, or a modified version of each received subsequent chirp, with a respective expected subsequent chirp to produce a respective set of subsequent correlation results, wherein each of said sets of subsequent correlation results comprise: a subsequent prompt correlation peak having a greater correlation magnitude than any other correlation peaks present in that subsequent set of correlation results, and a subsequent additional correlation peak; the processor may suitably be configured to form an updated estimate of the fractional timing offset or fractional frequency offset of the received chirp signal from the receiver device by: comparing the relative magnitudes of each of the subsequent prompt correlation peaks and the respective subsequent additional correlation peaks to form a set of subsequent estimates, and averaging the first estimate and all of the subsequent estimates to form the updated estimate; and the adjustment unit may suitably be configured to cause the adjustment of the relative timing or frequency of the chirp receiver and the chirp transmitter by the updated estimate.

According to a second aspect of the present invention there is provided a system for chirp communications comprising: a receiver device as described above; and a transmitter device comprising: a chirp generator configured to generate the first chirp having the first gradient, the magnitude of said first gradient being greater than one; and a chirp transmitter configured to transmit said first chirp over the link to the receiver device.

According to a third aspect of the present invention there is provided a method of synchronising a receiver with a chirp signal sent over a link from a transmitter, comprising: receiving a chirp signal comprising a first chirp, wherein the first chirp has a first gradient, the magnitude of said first gradient being greater than one; correlating the received first chirp, or a modified version of said received first chirp, with an expected chirp to produce a set of correlation results, wherein said set of correlation results comprise: a prompt correlation peak having a greater correlation magnitude than any other correlation peaks present in the correlation results, and a first additional correlation peak; making an estimate of the fractional timing or frequency offset of the link by comparing the relative magnitudes of the prompt correlation peak and the first additional correlation peak; and adjusting the relative timing or frequency of the receiver and the transmitter by the estimate.

BRIEF DESCRIPTION OF DRAWINGS

The following disclosure will now be described by way of example with reference to the accompanying drawings. In the drawings.

DETAILED DESCRIPTION

Figure 1:
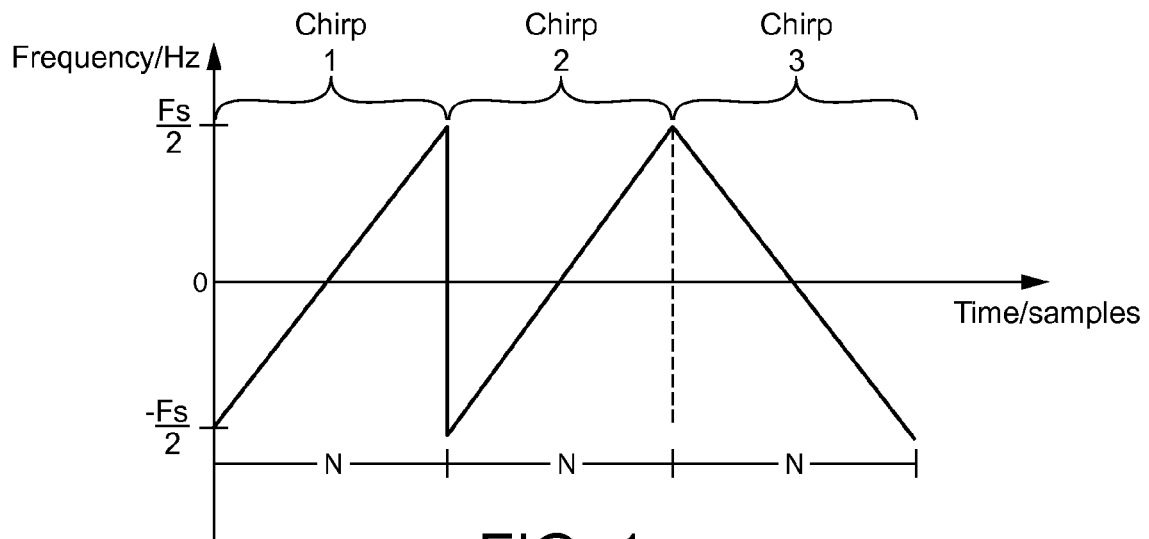
FIG. 1 depicts a sequence of chirps in the frequency-time plane.
Figure 2:
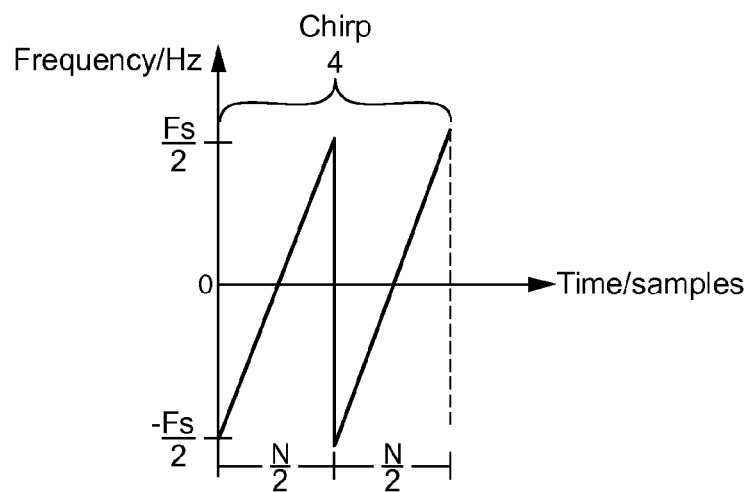
FIG. 2 depicts a chirp having a gradient of 2 in the frequency-time plane.
Figure 3A:
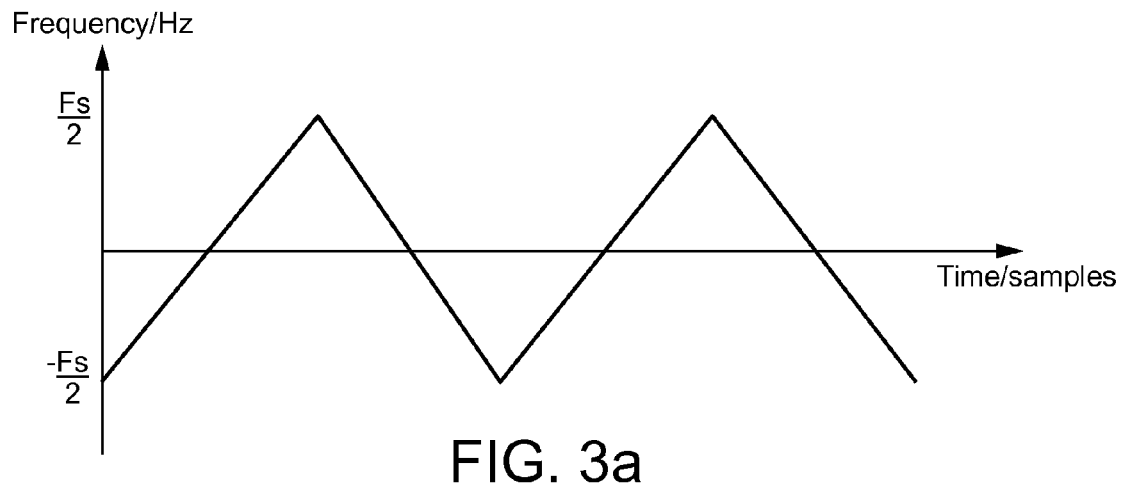
FIGS. 3a-b illustrate a known synchronisation signal and method.
Figure 3B:
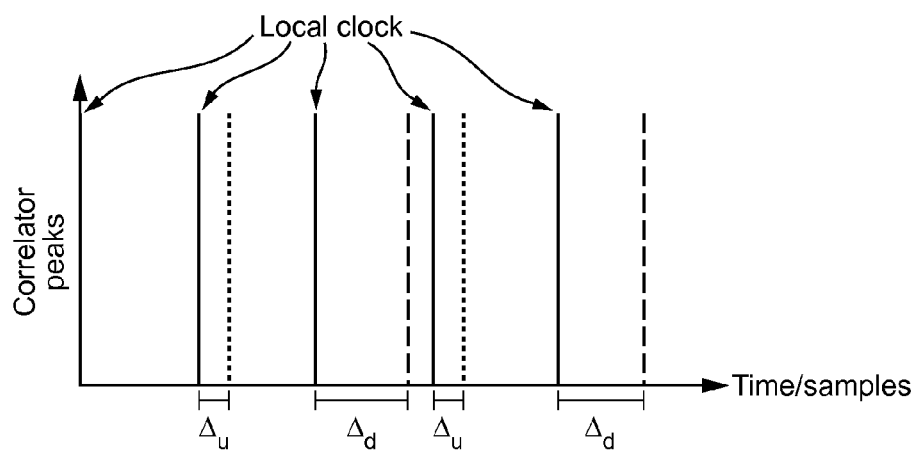

The following description is presented to enable any person skilled in the art to make and use the system, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The following disclosure is directed to a method for maintaining the synchronisation of a receiver with a chirp signal sent over a link from a transmitter. The chirp signal comprises at least a first chirp having a gradient greater than one. The transmitter may encode data on to the signal by varying the properties of the chirps it transmits. For example the cyclic-rotation of the first chirp may correspond to a particular symbol value. The receiver correlates the received first chirp (or a modified version of it) with an expected reference chirp, in all possible cyclic-rotations, to produce a set of correlation results. Should the gradient of the received chirp (or the modified version of it if applicable) match the gradient of the expected reference chirp, then, under normal operating conditions, a distinct large peak will be present having a greater magnitude than any other correlation peaks present in the correlation results. This will be referred to as the "prompt" peak. Transmitted data symbols may be inferred from properties of this prompt peak, for example its position in samples in the correlation results.

In addition to the prompt peak, if there is any fractional timing (and/)or frequency offset between the transmitter and the receiver, there will also be at least one additional peak in the correlation results.

The fractional timing (and/)or frequency offset may be estimated by comparing the relative magnitudes of the prompt correlation peak and the additional correlation peak(s). The relative timing (and/)or frequency of the receiver and the transmitter may then be adjusted by that first estimate so that timing (and/)or frequency synchronisation is maintained.

The position of any additional peaks depends on exactly how the correlation is performed. Their location with respect to the prompt peak may be used to identify their cause.

There are a number of ways of performing the correlation that generate similar correlation magnitudes but with the various peaks appearing in different places. In one approach (as described in the present applicant's co-pending UK patent application number 1106609.9), the received first chirp is multiplied with a conjugate of a chirp with the expected (transmitted) gradient minus one, and then the result of that multiplication is correlated with a unity gradient chirp, in all cyclic positions. This is described in more detail below. In this case, any fractional timing offset causes an additional peak to appear g samples from the prompt correlation peak, where g is the gradient of the transmitted first chirp. Any fractional frequency offset causes an additional peak to appear one sample from the prompt correlation peak. Should there be both fractional timing and frequency offsets then two significant peaks will appear one sample and g-samples from the prompt. Under the correct conditions these three peak heights can be used to determine both the fractional timing and frequency offsets. The sign of the timing or frequency offset determines whether the respective additional peaks occur before or after the prompt peak.

In an alternative implementation, the correlator directly correlates the received first chirp with a reference chirp having the same gradient, without any intermediate multiplication by another chirp. In this case the locations of the additional peaks for fractional timing and frequency offsets with respect to the prompt peak are reversed compared to the approach described above. That is, an additional peak due to a fractional timing offset is located one sample from the prompt peak, and an additional peak due to a fractional frequency offset is located g samples from the prompt peak. Other implementations using different gradients for intermediate multiplications and correlations can also be used. In these approaches the positions of the additional peaks are different again but still predictable.

If the received signal has fractional timing and/or frequency offsets, then the main peak magnitude will be reduced in size. At worst case the fractional frequency and timing offsets could be equivalent to 0.5 samples. In this case the signal level may reduce to about 0.3 of its maximum level. This reduces the sensitivity of the receiver to the received signal. During normal operation the tracking mechanism described may be configured to prevent timing and frequency offsets from reaching 0.5 samples. Preferably, the limits are kept within 0.2 samples.

Example correlation results which illustrate the effect of fractional timing and frequency offsets are shown in FIG. 4. Note that the correlation results shown in FIG. 4 are idealised in the sense that noise and processing artefacts such as signal smearing due to filters etc. are not shown. Only the prompt peak and additional peaks due to fractional timing and frequency offsets are depicted.

Note that in a practical system, with fractional timing and frequency offsets there may be other smaller peaks in addition to the peaks ±g and ±1 samples from the prompt peak. Under most circumstances these smaller peaks do not significantly affect the results achieved using the five peaks discussed. The more correlation results that are used, and the more complete the model, the better the timing and frequency estimate accuracy that can be achieved, albeit at the expense of additional processing complexity.

Figure 4A:
FIGS. 4a-d show example correlation results.

FIG. 4a shows example correlation magnitude results when there is no timing or frequency offset. In this case there is only a single correlation peak at $t_p$. The value of $t_p$ may encode a particular data symbol.

Figure 4B:
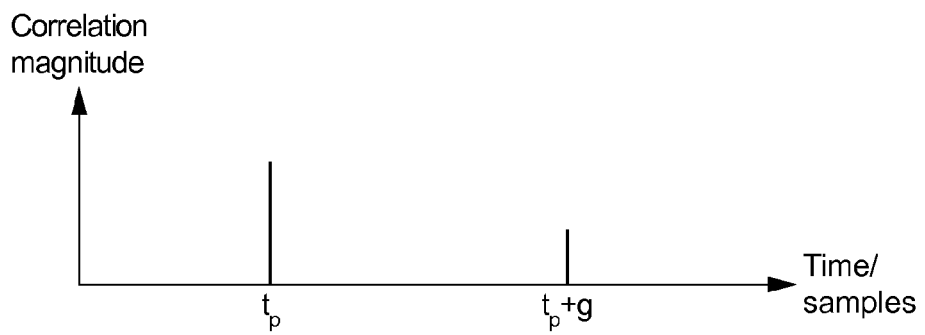

FIG. 4b shows example correlation magnitude results when there is a fractional timing offset but no frequency offset. In this case, the prompt peak is reduced in size and a smaller additional peak appears g samples from it, where g is the gradient of the received chirp. The magnitudes of the additional peak and the prompt peak can be fed into a model of the radio transmit and receive chain and where possible, a model of the radio channel, to obtain a good estimate of the sign and magnitude of the timing error.

Figure 4C:

FIG. 4c shows example correlation magnitude results when there is a fractional frequency offset but no timing offset. In this case, the prompt peak is reduced in size compared to FIG. 4a and a smaller additional peak appears 1 sample from it. The magnitudes of the additional peak and the prompt peak can be fed into a model of the radio transmit and receive chain and where possible, a model of the radio channel and clock, to obtain the best estimate of the sign and magnitude of the frequency error.

Figure 4D:
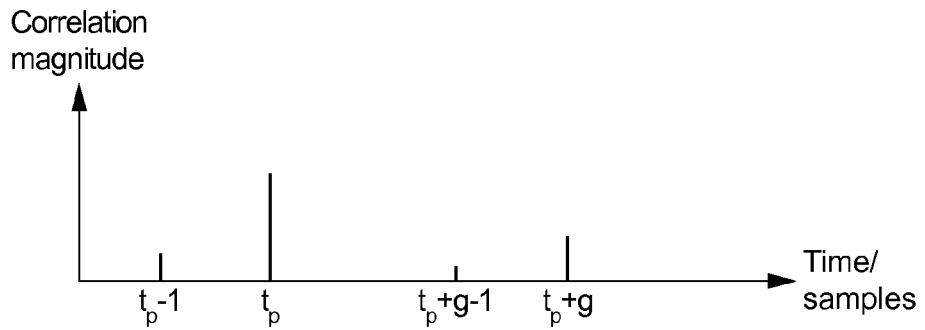

FIG. 4d shows example correlation magnitude results when there are both fractional timing and frequency offsets. In this case, the prompt peak is reduced in size further. Smaller additional peaks appear one, g and g minus one samples away from the prompt peak. A similar analysis of the peaks as described for FIGS. 4b and 4c yields both the fractional frequency and timing offset values.

If the received chirp had a gradient with a magnitude of 1 then some of the correlation peaks might overlap, and if the received chirp had a gradient with a magnitude between zero and one some peaks might be located too close together to be distinguishable from one another. Processing artefacts can lead to further additional peaks mirroring the true timing/ frequency offset peaks. With this duplication present, similar problems arise for gradients with magnitudes of two and of between one and two. As will become apparent from the explanation of the synchronisation method below, correlation peaks due to fractional timing or frequency offsets should be identifiable as such; all the correlation peaks should be distinguishable. Therefore chirps transmitted in a communication system utilising the present synchronisation method should have gradients with magnitudes of greater than one. It has been found in practice that integer gradients with magnitudes greater than two are generally preferable. Note that a gradient of k·N−x is equivalent for these purposes to a gradient of −x where k is an integer and x is an arbitrary real number. Therefore a chirp having a gradient of, for example, N−1 would produce a correlation peak of the same magnitude as a chirp having a gradient of −1 or 1 and would result in the same peak overlap problem as those gradients. Thus, in the context of this application, the magnitude of a gradient being greater than one means the gradient g obeys:

$$1 < |g| < N-1 \tag{4}$$

The correlation magnitude results shown in FIG. 4 and described above are the result of a multiplication by a conjugate chirp with gradient g−1 followed by correlation with a unity gradient chirp. If received chirps are simply correlated against expected replicas of themselves then FIGS. 4b and 4c would be reversed; that is any fractional frequency offset peak would appear g samples from the prompt peak, and any fractional timing offset peak would appear one sample from the prompt peak.

Provided the timing and frequency offsets are small, the additional peaks will be small compared to the prompt peak. This allows the prompt peak to be easily identified and data extracted from its properties (for example the value of $t_p$). In one specific example, in order to save power the frequency and/or timing may not be adjusted after receipt of every chirp. Analysis of each chirp could be performed, and timing/frequency errors of less than some threshold value (for example 0.2 samples) could be tolerated; adjustment would only be performed if an error exceeded the threshold. This approach has the additional advantage of avoiding adjustments being made following incorrect identification of a noise peak as a fractional timing/frequency offset peak.

Alternatively, since the relative heights of the additional peaks reflect the timing and frequency offset in a consistent way, regardless of the transmitted data value, the main and side peak values can be averaged over multiple chirps. For example, a whole packet of chirps could be received, with the selected peak magnitude values averaged over the packet, then at the end of the packet a single calculation can be performed and the timing and frequency adjustment made.

Figure 5:
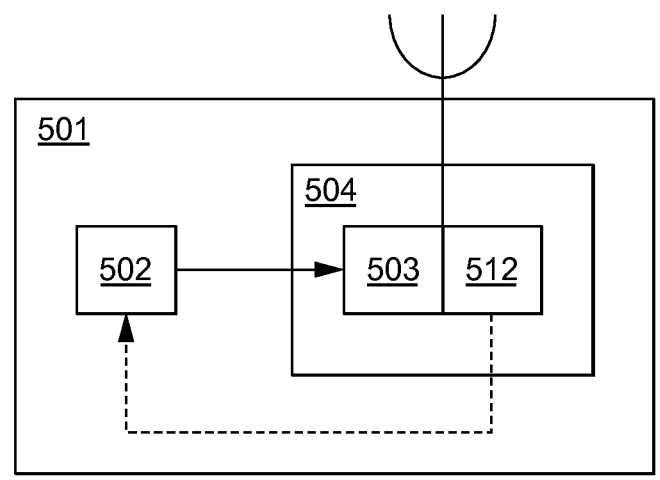
FIG. 5 is a schematic diagram of a chirp communications system.
Figure 5:
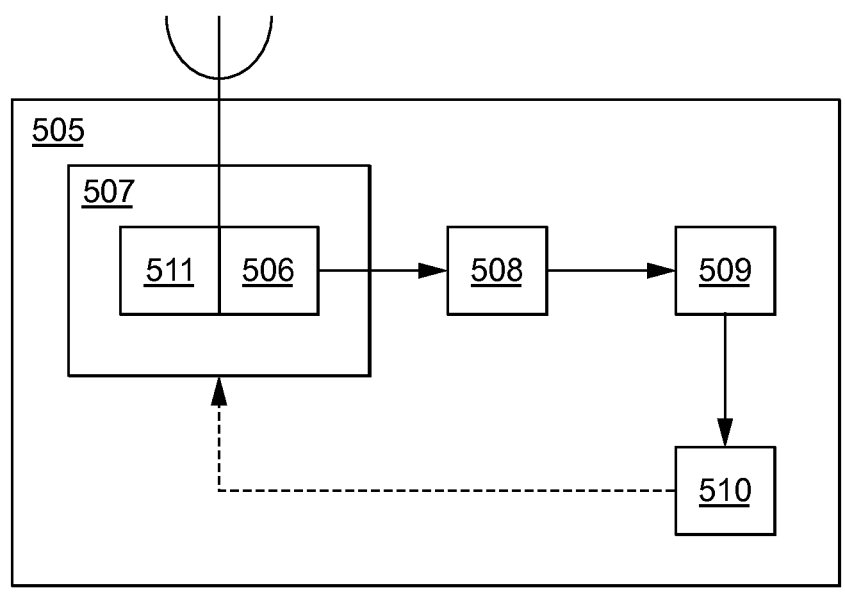

Chirp signals may be communicated in a chirp communications system such as that shown schematically in FIG. 5. FIG. 5 shows exemplary components of a chirp communications system according to the methods described herein. This figure illustrates the layout of exemplary transmitter and receiver devices comprised in the system in terms of functional boxes. The operations of one or more of these functional boxes may be combined in the transmitter or receiver devices or performed by separate components. It will be understood that this figure does not illustrate all of those conventional components of a chirp communications system known to a person skilled in the art.

A chirp transmitter device 501 comprises a chirp generator 502 which generates chirp signals for transmission by a chirp transmitter 503 comprised in an antenna unit 504 to a chirp receiver device 505.

In a specific example, the chirp signals produced by chirp generator 502 may comprise chirps described by Zadoff-Chu codes. Suitably, contiguous symbols could have different Zadoff-Chu codes. Contiguous symbols could also have different centre frequencies. Using different Zadoff-Chu codes for each symbol provides a degree of coded separation, allowing more than one user to use the frequency spectrum at the same time.

Chirp receiver device 505 comprises a chirp receiver 506 comprised in an antenna unit 507 which receives chirp signals from transmitter device 501 and passes them to a correlating unit 508. Chirp receiver 506 may comprise one or more filters, amplifiers, baseband mixers etc. and may modify the chirp signals received by the antenna with these or in other ways before passing them to correlating unit 508. Correlating unit 508 correlates the received chirps with expected chirps and passes the correlation results to a processor 509. Processor 509 processes the correlation results in order to form estimates of the timing and frequency offsets of the received chirp signal from the receiver device. These are then passed to an adjustment unit 510 which adjusts the relative timing and frequency offsets between the transmitter and receiver devices by issuing a control signal to antenna unit 507.

Typically, this control signal will control the chirp receiver 506 so that its timing and frequency matches that of the incoming chirp signals. Alternatively, for example if the receiver device needs to be small and/or low cost and therefore of as little complexity as possible, the control signal may control a transmitter 511 optionally comprised in antenna unit 507 to transmit a signal to chirp transmitter device 501. This signal is received by a receiver 512 optionally comprised in antenna unit 504 which then controls chirp generator 502 so that it produces chirp signals with timing and frequency which matches that of chirp receiver device 505.

Figure 6:
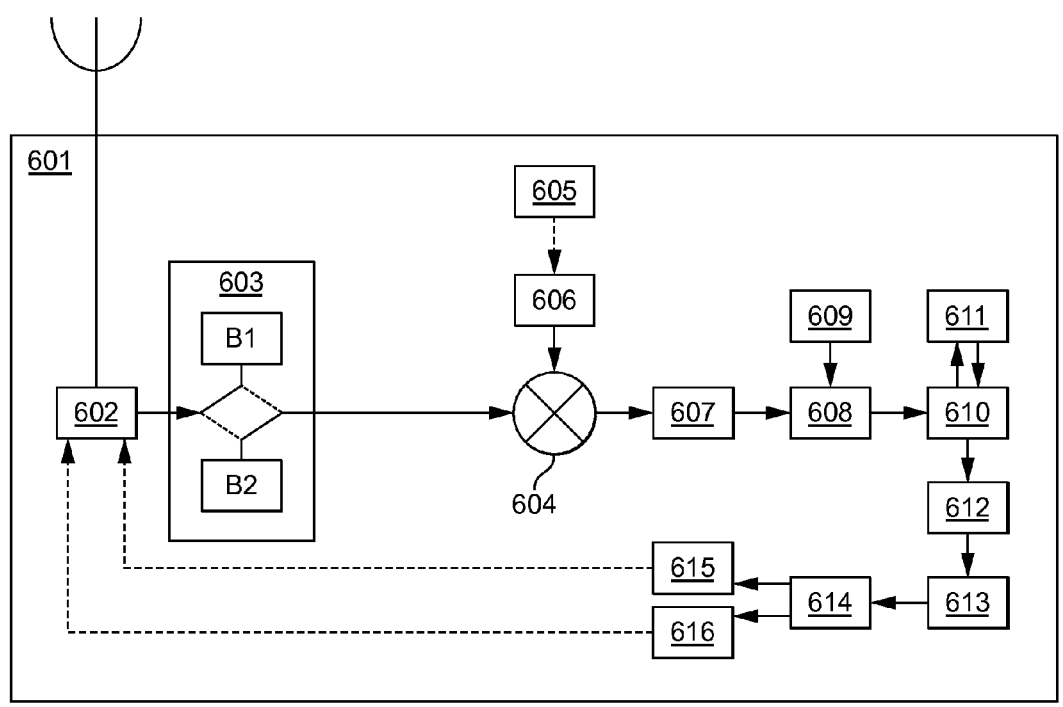
FIG. 6 is a schematic diagram of a chirp receiver device.

Reference is now made to FIG. 6 which is a schematic diagram of the exemplary components of a chirp receiver device 601 for implementing the synchronisation method described herein. FIG. 6 incorporates further components which are not necessarily required to implement the synchronisation method described herein. Chirp receiver device 601 is one way of implementing the chirp receiver device shown at 505 in FIG. 5. The functional boxes shown in FIG. 6 could be grouped to perform the functions of the higher level functional boxes shown comprised in chirp receiver device 505 of FIG. 5. FIG. 6 illustrates a schematic diagram showing exemplary components of a chirp receiver device according to the methods described herein. This figure illustrates the layout of the receiver in terms of functional boxes. The operations of one or more of these functional boxes may be combined. It is understood that this figure does not illustrate all of those conventional components of a receiver known to a person skilled in the art.

A chirp signal is received by a receiver unit 602. The samples of a received chirp of the chirp signal may be input to a buffer module 603. Suitably, buffer module 603 comprises two buffers, B1 and B2. This enables one buffer to be receiving samples whilst the other buffer is being read. When the input buffer becomes full the two buffers are swapped over so that input samples can continue to be sampled and stored without loss. The output buffer may be read multiple times. With suitably fast digital processing clock rates these buffers can provide a means to decode and track received chirps in real time.

The received chirp samples output from the buffer module 603 are input to a chirp multiplier 604. Under the control of a processor 605, a chirp generator 606 generates a chirp mixer sequence which has a gradient $g_m$ which differs from the expected gradient g of the chirp output from the buffer module 603 by a fixed value $g_c$. Preferably, this fixed value is 1. Preferably, $g_m = g-1$. Preferably, the chirp mixer sequence has the same number of samples in a chirp N, bandwidth $F_s$ and centre frequency as the chirp output from the buffer module 603 is expected to have by the receiver.

Prior to receiving the chirp signal at the receiver, the processor 605 may pre-agree the gradients of the symbols in the chirp signal with the transmitter of the chirp signal. Hence, the processor is able to control the chirp generator to generate chirps that are related to the received chirps as described.

Suitably, the chirp multiplier 604 multiplies the received chirp with the conjugate of the reference chirp generated by chirp generator 606. The multiplied chirp output from the chirp multiplier 604 is input to a quantiser 607. The output of quantiser 607 is input to a correlator 608.

Suitably, the correlator 608 correlates the multiplied chirp with a conjugate of the fixed correlating chirp. The fixed correlating chirp has a gradient which is equal to the fixed value $g_c$. The fixed correlating chirp is stored in store 609. Preferably, the fixed correlating chirp has unity gradient.

Figure 7:
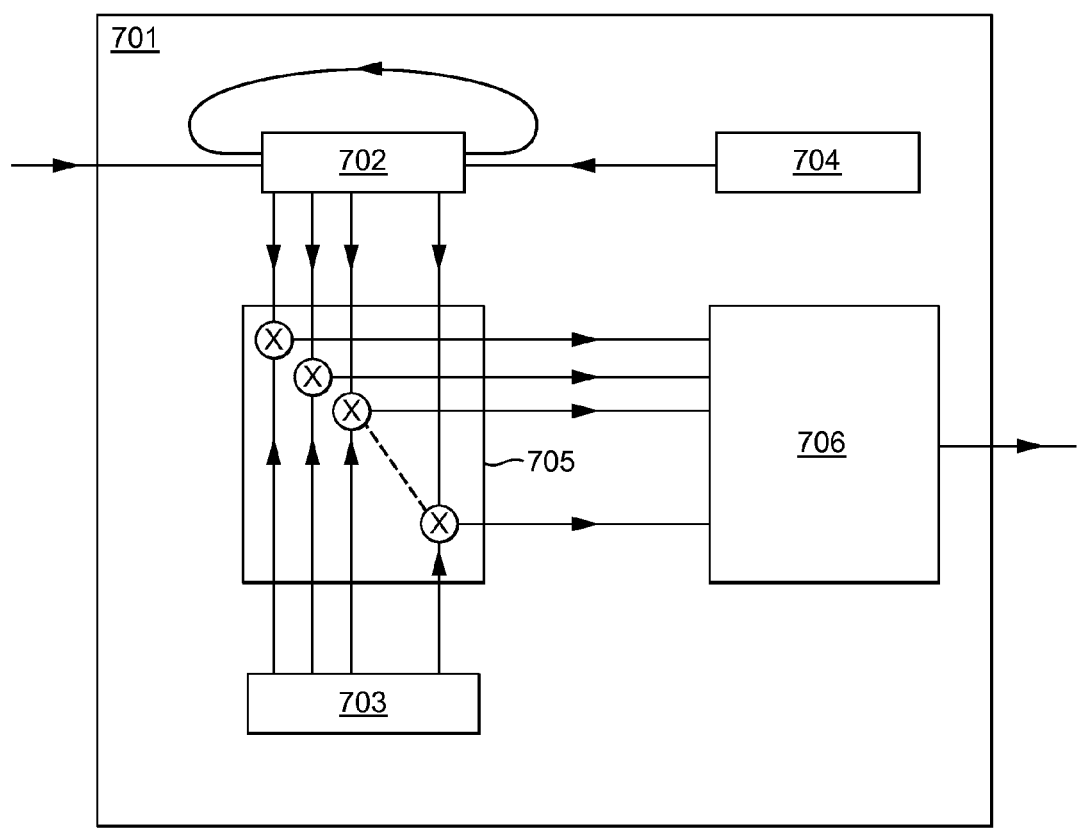
FIG. 7 illustrates an exemplary correlator.

FIG. 7 shows an exemplary correlator 701 which could be used as correlator 608. The N samples of the multiplied chirp signal output from quantiser 607 are first loaded into an N-stage circular shift register 702. The fixed gradient correlating chirp signal consists of one chirp of N samples which are preloaded into a correlating chirp module 703. A shift counter 704 is preloaded with the number of shifts, and hence the number of outputs of correlator 701. During normal operation shift counter 704 is preloaded with N, but when using reduced symbol alphabets or if N is non-prime then shift counter 704 could be loaded with less than N. The correlator 701 comprises N complex multipliers 705, each taking a complex input from the N-stage circular shift register 702 samples, and the corresponding complex input from the correlating chirp module 703. The output from the N complex multipliers is then summed at adder 706 to yield a single complex correlator sample that is output from the correlator 701. For each successive correlation, the N-stage circular shift register 702 rotates by one. If the sample at the beginning of the N-stage circular shift register is s for one correlation, then the sample at the beginning of the N-stage circular register is s−1 for the next correlation. In this way, the correlator performs a correlation between the fixed gradient correlating chirp and N cyclic phases of the multiplied chirp, generating N outputs. Provided the received chirp, the reference chirp and fixed correlating chirp have gradients such that $g=g-g_c$, the correlator outputs a strong prompt correlation peak when the cyclic phase of the multiplied chirp matches that of the fixed gradient correlating chirp and smaller values in other positions.

In an alternative implementation, the received chirps are not mixed with reference chirps to form chirps having a unity gradient. In this alternative implementation, each received chirp is correlated with a correlating chirp having a gradient matching the expected gradient of the received chirp. However this approach requires a greater silicon chip area than that described above.

Returning to FIG. 6, the output of the correlator 608 may be input into buffers 610. If a received symbol comprises a plurality of identical chirps, then the correlator output for each constituent chirp is stored in buffers 610. The correlator outputs of the identical chirps are then coherently integrated in coherent integrator 611 and stored in buffers 610.

Suitably, the output of the buffers 610 is input to an absolute value module 612. The absolute value module returns the magnitude of the complex signal input from the correlator 608. The output of absolute value module 612 is input to further buffers 613, where non-coherent integration takes place. Peak comparison module 614 then identifies the prompt peak and any peaks due to fractional timing or frequency offsets, and performs an estimation of the fractional frequency and timing offsets.

The outputs of peak comparison module 614 are used to drive a delay locked loop (DLL) 615 for adjusting the timing of the receiver unit 602, and a frequency locked loop (FLL) 616 for adjusting its frequency. As an alternative to an FLL, 616 could be a phase locked loop (PLL) if it also obtained the phase of the prompt peak from correlator 608.

Figure 8:
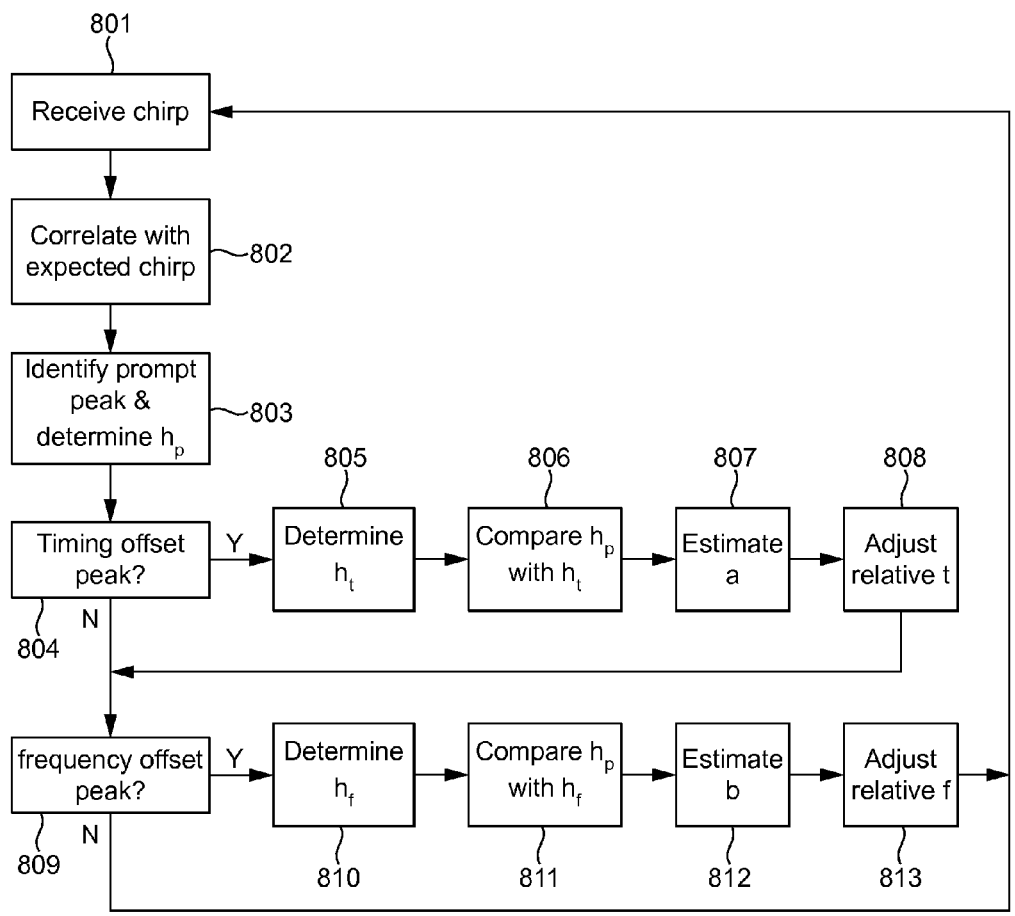
FIG. 8 is a flow chart illustrating a method of maintaining synchronisation between a chirp receiver and a chirp transmitter.

Reference is now made to FIG. 8 which illustrates the pertinent steps of a method of synchronising a receiver with a transmitter. This method may be performed in a communication system comprising receiver device 505 of FIG. 5 or 601 of FIG. 6 or any other device or devices capable of performing the method recited.

At step 801 a chirp is received. This step may involve some pre-processing such as filtering, amplification, mixing, multiplication etc. for example as previously described in relation to example receiver devices.

At step 802 the received chirp is correlated with an expected chirp.

Preferably, the correlation at 802 is performed by first multiplying each received chirp with a generated chirp having a gradient 1 minus the gradient of the (known gradient) received chirp, so as to result in the multiplied chirp having unity gradient. Suitably, each multiplied chirp in the resulting sequence of multiplied chirps is then correlated with a generated chirp having unity gradient.

Alternatively, the correlation at 802 is performed by correlating each received chirp with an expected chirp having a gradient matching the gradient of the received chirp. Preferably, this expected chirp is a conjugate of the received chirp.

Preferably, the correlator is a cyclic correlator. The correlator performs a correlation between the generated chirp and N cyclic phases of the multiplied chirp (or received chirp), generating N outputs. N is the number of samples in a chirp. The correlator outputs a strong correlation peak (the prompt peak) when the cyclic phase of the multiplied chirp (or received chirp) matches that of the generated chirp and smaller values in other positions.

At step 803 the prompt correlation peak is identified (for example by finding the correlation peak with the highest magnitude) and its magnitude, $h_p$ determined.

In some implementations, during step 803 the correlator outputs may be corrected for receiver noise. The amount of noise in each peak could be estimated, for example, by measuring the average power level in the remaining correlator outputs, after the main and additional peak bins have been removed. This noise estimate may be averaged over multiple symbols to provide an improved estimate. The noise estimate can be used (for example with a knowledge of the Rice probability distribution) to correct the relevant correlator outputs by removing the contribution due to noise.

At step 804 it is determined whether any additional correlation peaks are present due to a timing offset. This may be done by determining whether any correlation peaks are present g samples from the prompt peak if the unity gradient correlation method is used, or one sample from the prompt peak if the direct correlation method is used.

If only one additional timing offset peak is identified, then at step 805 its magnitude, $h_t$ is determined. If two additional timing offset peaks are identified, then at step 805 the largest additional timing offset peak is taken.

Alternatively, both of additional timing peaks and the main peak are fed into a system model, from which the timing estimate is determined Alternatively, more of the correlator outputs are fed into a system model, from which the timing estimate is determined.

At step 806 a comparison of $h_t$ and $h_p$ is made in order to estimate the fractional timing offset, a at step 807. The fractional timing offset can be estimated from the prompt peak magnitude, largest additional timing peak magnitude and which side of the prompt peak that largest additional timing peak occurred on. In one approach, a linear model is assumed, where the two values represent two samples from an ideal "triangular" response, which is a maximum at the ideal timing, and falls to zero g samples either side. The aim is to identify the best timing given the two measurements. In an alternative approach, all the imperfections of the receiver, transmitter and radio channel are modelled. The two timing measurements are fed into the model, which returns the most likely timing estimate, consistent with the observations.

At step 808 the relative timing of the transmitter and receiver is adjusted by a.

Once the timing has been adjusted, or if no timing offset peaks are found, then at step 809 it is determined whether any correlation peaks are present due to a frequency offset. This may be done by determining whether any correlation peaks larger than a threshold are present 1 sample from the prompt peak if the unity gradient correlation method is used, or g samples from the prompt peak if the direct correlation method is used.

If only one frequency offset peak is identified, then at step 810 its magnitude, $h_f$ is determined. If two additional frequency offset peaks are identified, then at step 810 the largest additional frequency offset peak is taken.

Alternatively, both of the additional frequency peaks and the main peak are fed into a system model, from which the frequency estimate is determined.

Alternatively, more of the correlator outputs are fed into a system model, from which the frequency estimate is determined.

At step 811a comparison of $h_f$ and $h_p$ is made in order to estimate the fractional frequency offset, b at step 812. The fractional frequency offset can be estimated from the prompt peak magnitude, largest additional frequency peak magnitude and which side of the prompt peak that largest additional frequency peak occurred on. In an alternative approach, all the imperfections of the receiver, transmitter and radio channel are modelled. The two frequency measurements are fed into the model, which returns the most likely frequency estimate, consistent with the observations.

At step 813 the relative frequency of the transmitter and receiver is adjusted.

Once the frequency has been adjusted, or if no frequency offset peaks are found, then the next chirp is received and the process starts again.

An example signal processing method will now be described for the case in which the transmitted signal comprises a length N Zadoff-Chu chirp, with gradient g, cyclically rotated by a data symbol value v. Such a signal may be represented by:

$$T(n) = \exp\left(j\pi \frac{g(n-v)(n-v+1)}{N}\right) \quad | n = 0 \text{ to } N-1 \quad (5)$$

By the time the signal is received it has undergone a frequency impairment of b(Fs/N) Hz, so that the received signal may be represented by:

$$R(n) = \exp\left(j\pi \frac{g(n-v)(n-v+1)}{N}\right) \cdot \exp\left(j\pi 2b\frac{n}{N}\right) \quad | n = 0 \text{ to } N-1 \quad (6)$$

In order to simplify the correlation process, this received signal is then multiplied by a chirp mixer sequence with gradient $g_m = g - g_c$ where $g_c$ is the gradient of the reference chirp used in the correlation, and may for example be unity. The chirp mixer sequence may be represented by:

$$M(n) = \exp\left(j\pi \frac{-g_m n(n+1)}{N}\right) \quad | n = 0 \text{ to } N-1 \quad (7)$$

The mixer output is then correlated with the conjugate reference chirp signal, gradient $g_c$, giving the correlator output:

$$C(m) = \quad (8)$$
$$\frac{1}{N} \sum_{n=0}^{N-1} R(n) \cdot M(n) \cdot \exp\left(-j\pi \frac{g_c(n-m)(n-m+1)}{N}\right) \quad | m = 0 \text{ to } N-1$$

which can be expanded as a geometric series. The absolute values of the correlator output samples are then taken, giving:

$$|C(m)| = \quad (9)$$
$$\frac{1}{N}\exp\left(j\pi\frac{g \cdot v(v-1) - g_c \cdot m(m-1) + (N-1)(b - g \cdot v + g_c \cdot m)}{N}\right) \cdot$$
$$\left[\frac{1}{N}\frac{\sin(\pi(b - g \cdot v + g_c \cdot m))}{\sin\left(\frac{\pi}{N}(b - g \cdot v + g_c \cdot m)\right)}\right] \quad | m = 0 \text{ to } N-1$$

For integer values of v, m, g, $g_c$ and b, this expression is exactly zero except for when $m = m_p$ where:

$$m_p = g_c^{-1} \cdot (g \cdot v - b) (\text{mod } N) \quad (10)$$

Equation 10 therefore gives the position of the prompt peak. It also shows that when b is close to zero the position of the prompt peak is not significantly affected, thus v (the value of the data symbol that was encoded by the original transmitted signal) may still be readily determined in the presence of a small frequency error.

When $|b| < \frac{1}{2}$ but the other variables in the list above retain integer values, the integer position of the prompt peak remains unchanged, but its shape is no longer a single peak, instead the absolute values of the correlator output samples are given by:

$$|C(m_p, b)| = \left|\frac{1}{N}\frac{\sin(\pi(-b))}{\sin\left(\frac{\pi}{N}(-b)\right)}\right| \quad (11)$$

which, to a good approximation, is:

$$|C(m_p, b)| \approx |\sin c(b)| \quad (12)$$

Thus the height of the prompt peak is reduced, but smaller peaks appear $g_c$ samples either side of it.

Equation (12) can be solved to obtain the value of b. The fractional frequency offset may be found by varying the magnitude and position of a sync function until a match is found to the correlator output, noting that $b = t_s/N \cdot F_s$ where b is the fractional frequency offset, $t_s$ is the time in samples that the sync function had to be moved, N is the chirp length and $F_s$ is the bandwidth.

Alternatively, b may be estimated from the heights of the prompt peak and the largest side peak according to:

$$h_e = |C(m_p - g_c)|; \quad (13)$$
$$h_p = |C(m_p)|;$$
$$h_l = |C(m_p + g_c)|$$
$$b \approx \frac{-h_l}{h_l + h_p} \quad |h_l > h_e;$$
$$b \approx \frac{h_e}{h_e + h_p} \quad |h_l \leq h_e$$

Where C(y), means the $[y(\text{mod } N)]^{th}$ element of the array C, with 0 as the first element.

Now turning to the case of a fractional timing offset, the received signal may be modelled using cyclic linear interpolation. Using the same transmitted signal T(n) as for the fractional frequency offset case (see equation (5)), a received signal having a fractional timing offset of a may be represented by:

$$R(n) = (1-a)\exp\left(j\pi \frac{g(n-v)(n-v+1)}{N}\right) + a\cdot\exp\left(j\pi\frac{g(n-v+1)(n-v+2)}{N}\right) \quad |n=0 \text{ to } N-1 \qquad (14)$$

After mixing with the chirp mixer sequence M(n) (see equation (7)) and correlating with the conjugate reference chirp as before, the correlator output is given by:

$$C(m) = \frac{1}{N}\sum_{n=0}^{N-1} R(n)\cdot M(n)\cdot \exp\left(-j\pi\frac{g_c(n-m)(n-m+1)}{N}\right) \qquad (15)$$

$$|m = 0 \text{ to } N-1$$

The geometric expansion of equation (15) is a sum of two terms, each being a product of a fraction of sine terms and an exponential. Provided g>1, only one of these terms is non-zero at a time, hence the phase can be ignored, and the absolute values of the correlator output samples are approximately given by:

$$|C(m)| \cong \left|\frac{1-a}{N}\frac{\sin(\pi(g_c\cdot m - g\cdot v))}{\sin\left(\frac{\pi}{N}(g_c\cdot m - g\cdot v)\right)}\right| + \left|\frac{a}{N}\frac{\sin(\pi(g_c\cdot m - g\cdot v + g))}{\sin\left(\frac{\pi}{N}(g_c\cdot m - g\cdot v + g)\right)}\right| \qquad (16)$$

These two terms represent two peaks whose magnitudes reflect the linear interpolation of the input signal in a linear way. Their positions ($t_1$, $t_2$) and magnitudes ($h_1$, $h_2$) are given by:

$$t_1 = g_c^{-1}\cdot v (\text{mod } N) \quad h_1 = 1-a$$

$$t_2 = g_c^{-1}(g\cdot v - g)(\text{mod } N) \quad h_2 = a \qquad (17)$$

thus, if $g_c=1$, the peaks are separated by g samples. The fractional timing offset is given by:

$$a = \frac{h_2}{h_1 + h_2} \qquad (18)$$

As can be seen from the analysis above, given an ideal input chirp, with a known gradient and no timing offset, the correlator output is a single prompt peak whose position reflects the chirp symbol value. When there is a fractional timing offset caused by cyclic-linear interpolation, the prompt peak is reduced in size and another peak appears g samples away from it. In the more general case, where non-cyclic and/or non-linear interpolation is applied there could be more than one additional peak. However, looking at the relationship between the prompt peak and its neighbour g samples away can still give a good approximation of the timing offset. Even though there may not be a linear relationship in that case, as long as the sign of the estimated offset is correct it can usefully be input to a DLL to correct for the offset.

In the more general case where both fractional timing and frequency offsets are present, the correlator output is given by:

$$C(m) = \qquad (19)$$

$$\frac{1-a}{N}\frac{\sin(\pi(b+g_c\cdot m - g\cdot v))}{\sin\left(\frac{\pi}{N}(b+g_c\cdot m - g\cdot v)\right)}\exp\left(j\pi\frac{g\cdot v(v-1) - g_c\cdot m(m-1) + (N-1)(b+g_c\cdot m - g\cdot v)}{N}\right) +$$

$$\frac{a}{N}\frac{\sin(\pi(b+g_c\cdot m - g\cdot v + g))}{\sin\left(\frac{\pi}{N}(b+g_c\cdot m - g\cdot v + g)\right)}\exp\left(j\pi\frac{g(v^2-3v+2)-g_c\cdot m(m-1)+(N-1)(b+g_c\cdot m - g\cdot v + g)}{N}\right)$$

$$|m = 0 \text{ to } N-1$$

Defining the right hand side of equation (19) as eq(N, $g_c$, g, b, a, m), and noting the magnitudes of the prompt peak and the largest timing offset and frequency offset peaks ($h_p$, $h_t$ and $h_f$ respectively), the fractional timing and frequency offsets may be estimated by minimising the function E which is defined as:

$$E = [|eq(N,g_c,b,a,m_p)| - h_p]^2 + [|eq(N,g_c,g,b,a\pm g,m_p)| - h_t]^2 + [|eq(N,g_c,g,b,a,m_p\pm g_c)| - h_f]^2 \qquad (20)$$

where, in the second term, the plus sign is used if the largest timing offset peak is to the right of the prompt peak and the minus sign is used if it is to the left; and in the third term, the plus sign is used if the largest frequency offset peak is to the right of the prompt peak and the minus sign is used if it is to the left. For an optimal solution in a real receiver, the function eq, may be extended to include radio and channel impairments, and would in principle provide a very good estimate of the frequency and timing offsets.

When either the fractional timing or frequency offsets are close to zero equations (18 and (13) can be used to obtain good approximations to the fractional timing and frequency offset estimates.

As an example, if N=257, then the gradient of the received chirp (g) is suitably between 50 and 100 or between 150 and 200. Note that for other values of N, the range of suitable values of g may be different. This range of values can be found experimentally or from simulation.

Suitably, the receiver and transmitter described herein are implemented in a system operating according to Bluetooth protocols.

Preferably, the chirp receiver and transmitter devices described herein are implemented in hardware. Alternatively, the chirp receiver and transmitter devices described herein may be implemented in software.

Suitably, the chirp receiver and transmitter devices described herein are implemented in long range radio communications. Typically, chirps are used for implementations that use a low data rate and low power. The chirp receiver and transmitter devices are suitable for use in high-sensitivity radio communications. Example implementations of the chirp receiver and transmitter devices are in a temperature sensor, a walkie-talkie or a wireless headset.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

What is claimed is:

1. A receiver device for receiving a chirp signal sent over a link by a chirp transmitter, comprising:
   a chirp receiver configured to receive a chirp signal comprising a first chirp, wherein the first chirp has a first gradient g, a magnitude of said first gradient being greater than one;
   a correlator configured to correlate the received first chirp, or a modified version of said received first chirp, with an expected first chirp to produce a first set of correlation results, wherein said first set of correlation results comprise:
      a first prompt correlation peak having a greater correlation magnitude than any other correlation peaks present in the first set of correlation results, and
      a first additional correlation peak; and
   a processor configured to make a first estimate of a fractional timing offset or fractional frequency offset of the received chirp signal from the receiver device by comparing relative magnitudes of the first prompt correlation peak and the first additional correlation peak; and
   an adjustment unit responsive to the processor configured to cause the adjustment of relative timing or frequency of the chirp receiver and the chirp transmitter by the first estimate.

2. A receiver device as claimed in claim 1, configured to receive said first chirp having said first gradient, wherein said first gradient has an integer value.

3. A receiver device as claimed in claim 1, configured to receive said first chirp having said first gradient, wherein said first gradient is greater than two.

4. A receiver device as claimed in claim 1, configured to receive a chirp signal comprising chirps described by Zadoff-Chu codes, wherein said chirps encode a series of data symbols and contiguous symbols have different Zadoff-Chu codes.

5. A receiver device as claimed in claim 1, wherein the processor is configured to extract a data symbol encoded in the chirp signal by determining the cyclic phase of the first chirp from the position of the first prompt correlation peak in the first set of correlation results.

6. A receiver device as claimed in claim 1, wherein the adjustment unit is configured to cause the adjustment of the relative timing or frequency of the chirp receiver and the chirp transmitter by adjusting the timing or frequency of the chirp receiver.

7. A receiver device as claimed in claim 6, wherein the adjustment unit is configured to:
   make adjustments to the timing of the chirp receiver using a delay locked loop; and/or
   make adjustments to the frequency of the chirp receiver using a frequency locked loop or a phase locked loop.

8. A receiver device as claimed in claim 1, wherein the adjustment unit is configured to only cause the adjustment of the relative timing or frequency of the chirp receiver and the chirp transmitter if the first estimate is greater than a predetermined threshold value.

9. A receiver device as claimed in claim 1, wherein the correlator is configured to correlate the received first chirp with an expected first chirp having a gradient matching the gradient of the received first chirp.

10. A receiver device as claimed in claim 9, wherein the processor is configured to:
    identify the first additional correlation peak as being due to a fractional timing offset if it is located one sample from the first prompt correlation peak; and
    identify the first additional correlation peak as being due to a fractional frequency offset if it is located |g| samples from the first prompt correlation peak.

11. A receiver device as claimed in claim 1, wherein the correlator is configured to:
    mix the received first chirp with a generated chirp having a gradient 1-g to form a first mixed chirp; and
    correlate the first mixed chirp with a chirp having unity gradient.

12. A receiver device as claimed in claim 11, wherein the processor is configured to:
    identify the first additional correlation peak as being due to a fractional timing offset if it is located |g| samples from the first prompt correlation peak; and
    identify the first additional correlation peak as being due to a fractional frequency offset if it is located one sample from the first prompt correlation peak.

13. A receiver device as claimed in claim 1, further comprising a processor configured to negotiate the gradients of the chirps in the chirp signal between the chirp transmitter and the receiver device.

14. A receiver device as claimed in claim 1, wherein the processor is configured to make the first estimate of the fractional timing offset or fractional frequency offset of the received chirp signal from the receiver device by dividing the magnitude of the first additional correlation peak by the sum of the magnitudes of the first prompt correlation peak and the first additional correlation peak.

15. A receiver device as claimed in claim 1, wherein:
    the chirp signal further comprises one or more subsequent chirps, each such subsequent chirp having a gradient with magnitude greater than one;
    the correlator is configured to correlate each received subsequent chirp, or a modified version of each received subsequent chirp, with a respective expected subsequent chirp to produce a respective set of subsequent correlation results, wherein each of said sets of subsequent correlation results comprise:
       a subsequent prompt correlation peak having a greater correlation magnitude than any other correlation peaks present in that subsequent set of correlation results, and
       a subsequent additional correlation peak;
    the processor is configured to form an updated estimate of the fractional timing offset or fractional frequency offset of the received chirp signal from the receiver device by:
       comparing the relative magnitudes of each of the subsequent prompt correlation peaks and the respective subsequent additional correlation peaks to form a set of subsequent estimates, and
       averaging the first estimate and all of the subsequent estimates to form the updated estimate; and
    the adjustment unit is configured to cause the adjustment of the relative timing or frequency of the chirp receiver and the chirp transmitter by the updated estimate.

16. A system for chirp communications comprising:
    a receiver device as claimed in claim 1; and
    a transmitter device comprising:
       a chirp generator configured to generate the first chirp having the first gradient, the magnitude of said first gradient being greater than one; and
       a chirp transmitter configured to transmit said first chirp over the link to the receiver device.

17. A method of synchronising a receiver with a chirp signal sent over a link from a transmitter, comprising:
- receiving a chirp signal comprising a first chirp, wherein the first chirp has a first gradient, a magnitude of said first gradient being greater than one;
- correlating the received first chirp, or a modified version of said received first chirp, with an expected chirp to produce a set of correlation results, wherein said set of correlation results comprise:
  - a prompt correlation peak having a greater correlation magnitude than any other correlation peaks present in the correlation results, and
  - a first additional correlation peak;
- making an estimate of a fractional timing or frequency offset of the link by comparing relative magnitudes of the prompt correlation peak and the first additional correlation peak; and
- adjusting a relative timing or frequency of the receiver and the transmitter by the estimate.

* * * * *

UNITED STATES PATENT AND TRADEMARK OFFICE
CERTIFICATE OF CORRECTION

PATENT NO. : 8,867,588 B2  
APPLICATION NO. : 13/602081  
DATED : October 21, 2014  
INVENTOR(S) : Hiscock Page 1 of 1

It is certified that error appears in the above-identified patent and that said Letters Patent is hereby corrected as shown below:

In the Specification

In Column 1, Line 54, delete "-$F_5$/2." and insert -- -$F_s$/2. --, therefor.

In Column 1, Line 67, delete "-$F_5$/2" and insert -- -$F_s$/2 --, therefor.

In Column 2, Line 48, delete "F" and insert -- $F_s$ --, therefor.

In Column 12, Line 37, delete "determined" and insert -- determined. --, therefor.

Signed and Sealed this  
Tenth Day of February, 2015

Michelle K. Lee  
*Deputy Director of the United States Patent and Trademark Office*